United States Patent
Kulprathipanja et al.

(10) Patent No.: US 8,404,917 B2
(45) Date of Patent: Mar. 26, 2013

(54) MIXED MATRIX ADSORBENT FOR SEPARATION OF GASOLINE COMPONENTS

(75) Inventors: Santi Kulprathipanja, Inverness, IL (US); Stephen W. Sohn, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 606 days.

(21) Appl. No.: 12/392,399

(22) Filed: Feb. 25, 2009

(65) Prior Publication Data

US 2009/0152170 A1 Jun. 18, 2009

Related U.S. Application Data

(62) Division of application No. 11/548,473, filed on Oct. 11, 2006.

(51) Int. Cl.
- *C07C 7/12* (2006.01)
- *C07C 7/13* (2006.01)
- *C10G 25/08* (2006.01)
- *C10G 25/12* (2006.01)

(52) U.S. Cl. .......... 585/826; 585/820; 208/310 R; 208/310 Z

(58) Field of Classification Search .......... 585/820, 585/826; 208/310 R, 310 Z
See application file for complete search history.

(56) References Cited

U.S. PATENT DOCUMENTS 5,055,633 A * 10/1991 Volles ............... 585/826
2004/0249230 A1 * 12/2004 Gillespie et al. ........ 585/750

OTHER PUBLICATIONS

Willms, R. Scott, "Cryogenic adsorption of low concentration hydrogen on charcoal, molecular sieve, UOP S-115, ZSM-5 and Wessalith DAY", In: Proceedings of the 15th IEEE Symposium on Fusion Engineering, Hyannis, Massachusetts, 61(1993) (no month), p. 62.*

* cited by examiner

*Primary Examiner* — Walter D Griffin
*Assistant Examiner* — Renee E Robinson
(74) *Attorney, Agent, or Firm* — Arthur E Gooding

(57) ABSTRACT

A mixed matrix adsorbent is found for use in the removal of light alkanes from a gasoline stream. The mixed matrix comprises two adsorbents with one adsorbent having an LTA type structure and the other adsorbent having an MFI structure.

6 Claims, No Drawings

MIXED MATRIX ADSORBENT FOR SEPARATION OF GASOLINE COMPONENTS

CROSS-REFERENCE TO RELATED APPLICATION

This application is a Division of prior copending application Ser. No. 11/548,473 which was filed Oct. 11, 2006, the contents of which are incorporated herein by reference thereto.

FIELD OF THE INVENTION

This invention relates to an improved process for upgrading gasoline through selective removal of low octane constituents from the mixture of hydrocarbons that make up gasoline.

BACKGROUND OF THE INVENTION

Gasoline is upgraded by improving, or raising, its octane number. The octane of a gasoline is its knock-resistance, which is a measure of the gasoline's resistance to autoignition. The autoignition causes the gasoline to prematurely combust and subsequently produces a knocking sound in an internal combustion engine. The knocking reduces the efficiency of the engine. The octane number is correlated with higher activation energies for a reaction to proceed, and therefore higher octane numbers have higher activation energies and a reduction in autoignition of a gasoline air mixture. Generally, gasoline is upgraded by reformulating the gasoline constituents by isomerization and aromatization. Gasoline is also upgraded by removing lower octane constituents from the mixture of hydrocarbons that make up gasoline. The lower octane constituents can be removed in several ways, but adsorptive separation provides an efficient method of selectively removing lower octane constituents from the mixture. This process technology is known as simulated moving bed process. The lower octane constituents are primarily smaller normal alkanes, such as normal pentane and normal hexane.

Improvements in the separation of light normal alkanes from gasoline can save equipment and energy costs.

SUMMARY OF THE INVENTION

The invention provides a mixed matrix adsorbent for use in the separation of light normal alkanes from a gasoline stream. The mixed matrix adsorbent comprises at least two adsorbents that selectively remove light normal alkanes, wherein one of the adsorbents has an LTA zeolite structure and the other of the adsorbents has an MFI type structure. In one embodiment, the first adsorbent is an A-zeolite and the second adsorbent is silicalite. In a preferred embodiment, the mixed matrix adsorbent has an LTA zeolite in an amount between 50% and 95% by volume and the MFI type adsorbent is in an amount between 5% and 50% by volume.

Another aspect of this invention comprises the process for removing light normal alkanes from a gasoline stream. The process comprises passing a gasoline stream over the mixed matrix adsorbent which selectively adsorbs the light normal alkanes. The process further comprises passing a heavy desorbent over the mixed matrix adsorbent for removing the light normal alkanes from the adsorbent for later processing. This provides for a less expensive method of boosting gasoline octane numbers, and for subsequent recovery of light normal alkanes from a stream comprising the desorbent and light normal alkanes. In a preferred embodiment, the heavy desorbent is a normal alkane in the C8 to C12 range.

Other objects, advantages and applications of the present invention will become apparent to those skilled in the art from the following detailed description.

DETAILED DESCRIPTION OF THE INVENTION

The improvement of the octane of gasoline entails selectively changing the composition, and primarily this means selectively removing the chemical constituents that are low octane components. The components to be removed are primarily normal alkanes such as normal pentane (n-C5) and normal hexane (n-C6) with minor amounts of normal heptane (n-C7). Currently, the method of improving the octane of gasoline is to use a commercial zeolite adsorbent, comprising a calcium exchanged LTA zeolite, for removing the light normal alkane constituents in the gasoline. The process uses a light desorbent comprising normal butane (n-C4) and isobutane (i-C4) during the desorption phase to remove the light alkanes form the adsorbent.

The removal of lower octane constituents from is performed using a simulated moving bed (SMB) process. The simulation of a moving adsorbent bed is described in U.S. Pat. No. 2,985,589 (Broughton et al.), which is incorporated by reference in its entirety. In accomplishing this simulation, it is necessary to connect a feed stream to a series of beds in sequence, first to bed no. 1, then to bed no. 2, and so forth for numerous beds, the number of beds often being between 12 and 24. These beds may be considered to be portions of a single large bed whose movement is simulated. Each time the feed stream destination is changed, it is also necessary to change the destinations (or origins) of at least three other streams, which may be streams entering the beds, such as the feed stream, or leaving the beds. The moving bed simulation may be simply described as dividing the bed into series of fixed beds and moving the points of introducing and withdrawing liquid streams past the series of fixed beds instead of moving the beds past the introduction and withdrawal points. A rotary valve used in the Broughton process may be described as accomplishing the simultaneous interconnection of two separate groups of conduits. There are numerous patents and publications describing the mechanical aspects and internals of the SMB apparatus.

The use of the SMB process for removing light normal alkanes from gasoline uses a zeolite adsorbent that preferentially adsorbs normal alkanes. A desorbent is chosen to displace the light alkanes during the desorption phase of the process, and the desorbent must be appropriate to enter the pores of the zeolite. Currently, the desorbent is a lighter, or smaller, alkane that can readily displace the normal pentane and hexane from the zeolite, but not too light as to present operational problems, such as operating at high pressures. The convenient desorbent is a mixture of normal butane and isobutane.

The use of heavier desorbents produced unacceptable results when used over a single adsorbent in the standard commercial practice.

The present invention has unexpectedly found that light normal alkanes can be removed from gasoline using a heavy desorbent when a mixture of adsorbents is used in the separation process. Instead of using a single adsorbent, the process uses at least two adsorbents, where each adsorbent is preferentially selective for normal alkanes. The adsorbents comprise an LTA zeolite in an amount from 5% to 95% of the adsorbent by volume and an MFI type molecular sieve in an amount from 5% to 95% of the adsorbent by volume. In the adsorbent, the LTA zeolite is preferred to be in the range from 50% to 95% by volume of the mixed matrix adsorbent, with a more preferred amount in the range from 70% to 90% by volume. The MFI adsorbent is preferred to be in an amount from 5% to 50% by volume with a more preferred amount from 10% to 30% by volume of the mixed matrix adsorbent.

In a preferred embodiment, the LTA zeolite selected is an A-zeolite, and it is preferred that the A-zeolite is exchanged with at least one alkali or alkaline earth metal cation. Preferred metals for substitution include sodium and calcium. The preferred MFI molecular sieve adsorbent is silicalite.

While this description primarily addresses the removal of light normal alkanes from gasoline, the operating conditions are therefore cited for performance of an SMB system with respect to this separation. It is preferred to operate the adsorption zone at conditions which include a temperature between about 60° C. and 180° C. (140° F. to 356° F.) as this provides better selectivity and capacity, and preferably between about 80° C. and 120° C. (176° F. to 248° F.). The separation process is preferably operated at a pressure from about 0.45 MPa (50 psig) to about 1.5 MPa (200 psig). The selection of operational conditions are chosen to maintain the gasoline in the liquid phase.

In the separation process, the feed mixture moves through a series of adsorbent beds, contacting the feed mixture with each of the beds. The light normal alkanes, normal pentane, hexane, and heptane, in the mixture is preferentially adsorbed onto the adsorbent in the beds. With the present invention, the adsorbents can be combined with both adsorbents mixed during the fabrication of the adsorbents such that adsorbent pellets include both adsorbents, or the adsorbents can be a physical mixture of the adsorbent pellets in each adsorbent bed. In the embodiment that the adsorbents are combined in each pellet, the pellet can have the first adsorbent in the pellet interior and the second adsorbent on the pellet exterior, or the pellet can have the second adsorbent in the pellet interior and the first adsorbent on the pellet exterior. The fabrication of adsorbent pellets is known in the art, as described in U.S. Pat. No. 6,649,802 and is incorporated by reference in its entirety. When the adsorbents are physically mixed, each adsorbent bed will contain the adsorbents as a mixture of the two adsorbents in the desired ratios as described above.

In an alternative arrangement, each adsorbent bed comprises two or more adsorbent sections, wherein the adsorption sections are layered, such that the feed mixture first contacts one of the adsorbents in a first section, and then contacts the other adsorbent in a second section. The sections will be sized to accommodate the first adsorbent and the second adsorbent to the appropriate volume ratios as described above. After passing through the adsorption sections, the feed mixture passes to the next adsorbent bed in the system which is also comprised of layered adsorption sections.

In an alternative, the process comprises a plurality of adsorbent beds, wherein the adsorbent beds are disposed in a sequential manner and alternate the adsorbent in each bed, such that the feed mixture flows over a first bed having the first adsorbent, then flows over a second bed having the second adsorbent, followed by a bed having the first adsorbent, and continuing in an alternating manner for the type of adsorbent. The beds would be sized according to the appropriate volumes for the adsorbents as described above. Likewise, the process can begin with the second adsorbent and continue in an alternating manner.

When the two adsorbents are used in separate layers, or separate beds, the liquid can flow over the adsorbents in either order, i.e. flow over the LTA zeolite adsorbent and then the silicalite adsorbent, or flow over the silicalite adsorbent and then the LTA zeolite adsorbent.

In addition, the removal of light alkanes allows for directing the light alkanes to other process units and processing the light alkanes through isomerization or other reactions to produce larger chemical constituents that can be added to gasoline or other high value products.

EXAMPLE

A mixed matrix adsorbent of a calcium exchanged LTA zeolite and silicalite was used in an 80:20 ratio by volume with an LOI of 3.6 wt. %. The LOI, or Loss on Ignition, is the level of hydration of the adsorbent as reported on a volatile free basis. A test was also performed using the commercial adsorbent with a heavy desorbent for comparison with the use of a heavy desorbent and the mixed matrix adsorbent. The results are for a pulse test using normal decane (n-C10) as the desorbent. The temperature of the test was 177° C. (350° F.), and the composition of the feed mixture to be separated for the test comprised: n-$C_5$, n-$C_6$ and i-$C_8$ in relative weight percentages of 14:7:79.

| Adsorbent | n-$C_5$ net ret vol (ml) | n-$C_6$ net ret vol (ml) | n-$C_6$/n-$C_5$ selectivity |
| --- | --- | --- | --- |
| Ca-LTA | 14.92 | 17.03 | 1.14 |
| Mixed matrix | 13.93 | 13.83 | 0.99 |

It is desirable to have a uniform recovery of n-$C_5$ and n-$C_6$. By having n-$C_5$ and n-$C_6$ separate adds expense and causes a loss of n-$C_5$ through zone I of the SMB process. Use of a single adsorbent with a heavy desorbant indicated uniform recovery of n-$C_5$ and n-$C_6$ was not achievable. To obtain uniform recovery, a mixture of adsorbents was used. The tests produced a uniform recovery of the n-$C_5$ and n-$C_6$ from the feed which is demonstrated with the n-$C_6$/n-$C_5$ selectivity of close to unity.

While the invention has been described with what are presently considered the preferred embodiments, it is to be understood that the invention is not limited to the disclosed embodiments, but is intended to cover various modifications and equivalent arrangements included with the scope of the appended claims.

The invention claimed is:

1. A process of removing normal pentane and normal hexane from gasoline, comprising:
    passing gasoline over a mixed matrix adsorbent for selectively removing normal pentane and normal hexane, wherein the mixed matrix adsorbent is in a simulated moving bed and consists essentially of:
        a first adsorbent comprising an A zeolite in an amount from 50% to 95% by volume of the mixed matrix adsorbent; and
        a second adsorbent comprising silicalite in an amount from 5% to 50% by volume of the mixed matrix adsorbent; and
    passing a liquid phase high molecular weight desorbent to desorb the normal pentane and normal hexane in a substantially uniform recovery from the mixed adsorbent.

2. The process of claim 1 wherein the liquid phase high molecular weight desorbent is a normal octane to dodecane hydrocarbon.

3. The process of claim 2 wherein the desorbent is normal decane.

4. The process of claim 1, wherein the A-zeolite is exchanged with a cation selected from the group consisting of sodium, calcium and mixtures thereof.

5. The process of claim 1, wherein the A-zeolite is from 70% to 90% by volume of the mixed matrix adsorbent.

6. The process of claim 1, wherein the silicalite is from 10% to 30% by volume of the mixed matrix adsorbent.

* * * * *